Aug. 11, 1925.
E. B. STIMPSON
1,549,520
FEEDING MECHANISM FOR RIVET SETTING MACHINES
Original Filed May 8, 1924
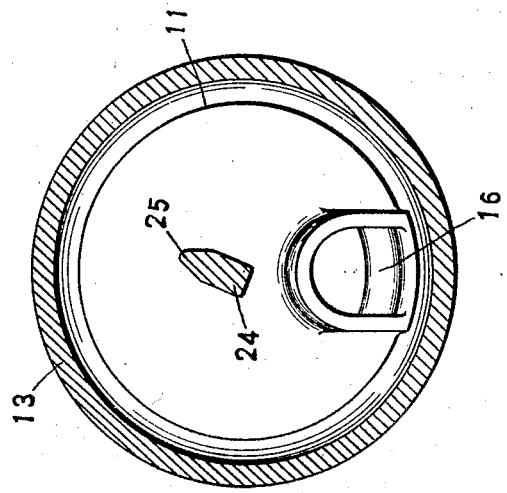
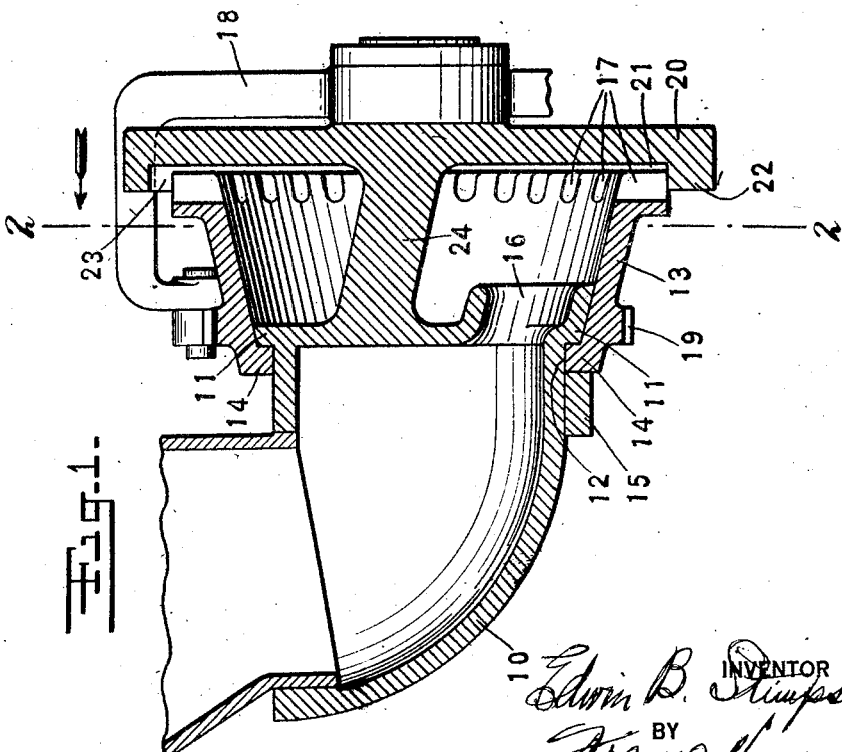
INVENTOR
Edwin B. Stimpson
BY
Frank Jelleny
ATTORNEY Patented Aug. 11, 1925.

1,549,520

UNITED STATES PATENT OFFICE.

EDWIN B. STIMPSON, OF BROOKLYN, NEW YORK, ASSIGNOR TO EDWIN B. STIMPSON COMPANY, OF BROOKLYN, NEW YORK.

FEEDING MECHANISM FOR RIVET-SETTING MACHINES.

Original application filed May 8, 1924, Serial No. 711,768. Divided and this application filed January 13, 1925. Serial No. 2,053.

*To all whom it may concern:*

Be it known that I, EDWIN B. STIMPSON, a citizen of the United States, residing at Brooklyn, in the county of Kings and State of New York, have invented certain new and useful Improvements in Feeding Mechanism for Rivet-Setting Machines, of which the following is a specification.

This invention relates to feeding devices for rivet setting machines and this application is a division of my prior application for patent Serial No. 711,768, filed May 8, 1924.

A general object of the invention is to provide rivet pick-up mechanism which will operate at a high degree of efficiency to feed rivets in a steady and uniform manner and without jamming or other interruptions.

The invention includes a frusto-conical pick-up wheel rotatable about a horizontal axis and provided with rivet receiving slots or notches in the edge at its larger end. Means are provided for supplying rivets to the pick-up wheel in such manner that the rivets will move down the sloping inner surface of the wheel and across the direction of travel thereof in their journey to the pick-up or receiving slots. The movement of the mass of rivets substantially transverse to the direction of travel of the engaged portion of the pick-up wheel provides for an effective agitation thereof with a resulting distribution of rivets into the receiving slots.

Other features of the invention will be hereinafter referred to.

In the drawings,

Figure 1 is a view in vertical section of a rivet feeding device embodying the invention.

Figure 2 is a sectional view taken on the line 2—2 of Figure 1.

Referring to the drawings for a more detailed description of the invention, a rivet feeding device is shown which includes a hopper or supply member 10 provided with a radially extending flange 11 at one end whereby a bearing support is provided at 12 for a rotatable rivet pick-up device 13.

The rivet pick-up device 13 has a hollow frusto-conical formation with a radially inward directed flange 14 at its smaller end, the flange 14 being journaled on the hopper member 10 in the angle formed therewith by the flange 11. A locking member 15 is provided for holding the parts in the assembled relation referred to.

The hopper member 10 is provided with a delivery orifice or discharge outlet 16 which is arranged to deliver rivets into the hollow pick-up member 13, the direction of discharge of the rivets being substantially in an axial direction with relation to the pick-up member.

The pick-up member 13 is provided at its larger end with a series of rivet receiving notches 17. In the operation of the device the pick-up member 13 is intermittently rotated on its bearing support through the operation of an arm 18 carrying a pawl for engagement with ratchet teeth 19 formed on the pick-up member adjacent the smaller end thereof. The intermittent rotation of the pick-up member 13 causes the rivets delivered thereinto from the discharge outlet 16 of the hopper to be stirred or agitated in their travel down the slope of the inside surface of the pick-up member to the notched end thereof. This stirring or agitation of the rivets is usefully employed in the arrangement or distribution of rivets into the series of receiving notches 17 so that in the continued rotation of the pick-up member rivets are carried in the notch end thereof to a point of delivery not shown herein.

In order to hold the rivets in position to be received in the notches 17, a closure plate 20 is provided which bridges the open end of the pick-up member 13 being spaced therefrom by a slight clearance as indicated at 21. The closure plate 20 is provided with an axially extending flange 22 which occupies an enclosing relation to the notched end of the pick-up member 13. The flange portion 22 of the closure plate 20 bears an eccentric relation to the notched end of the pick-up member so that the inside surface of the flange is spaced a greater distance from the edge of the pick-up member at the upper side thereof than at the lower side as is clearly indicated at 23 in Figure 1 of the drawings. The purpose of this is to provide a channel through a portion of the path of travel of the rivet members along which they are freely carried without interruption as they pass from the pick-up member into the delivery outlet.

In order to support the hopper 10, a bracket member 24 is provided which extends from the closure plate 20 to the confronting end of the hopper member and through the hollow pick-up member 13. In order to prevent the lodging of rivets on the upper surface of the bracket member 24 the bracket member is provided with a peaked construction that is indicated at 25 in Figure 2 and is also placed in an inclined position for the purpose referred to. The downwardly sloping construction afforded by the lowermost portion of the pick-up member 13 facilitates the movement of the rivets emerging from the outlet 16 to the position of the slots 17 which, in the rotation of the pick-up member agitate the rivets and thereby cause rivets to take positions within the slots whereupon they are carried upwardly over the upper arc of the circle to the delivery passage 23. The movement of the rivets axially from the discharge port 16 of the hopper to the position of the slots 17 assists in the orientation of the individual rivets in such manner that they are more readily disposed to take their proper positions within the slots.

What I claim is:—

1. In a rivet feeding device, a hollow pick-member rotatable about a horizontal axis, a hopper having a discharge port arranged to deliver rivets within the hollow pick-up member adjacent one end thereof whereby the rivets will travel axially of the member and across the direction of rotation thereof, said hollow member being provided with rivet-receiving notches in the other end thereof, and closure means for the latter end of the member.

2. In a rivet feeding device, a hollow pick-up member rotatable about a horizontal axis, a stationary hopper forming a bearing support for one end of the hollow member, said hopper being provided with a discharge port extending into said end of the hopper to deliver rivets in an axial direction therein, said hollow member being provided with rivet-receiving notches at the other end thereof, and a closure plate for the latter end of the hollow member, said closure plate and said hopper having a bracket connection extending through said hollow member.

3. In a rivet feeding device, a hollow frusto-conical pick-up member rotatable about a horizontal axis, a stationary hopper forming a bearing support for one end of the hollow member, said hopper being provided with a discharge port for delivering rivets in an axial direction thereto, said hollow member being provided with rivet-receiving notches at the other end thereof, a closure plate for the latter end of the hollow member, and said closure plate having an axially extending flange enclosing the notched end of the hollow member.

4. In a rivet feeding device, a hollow frusto-conical pick-up member mounted to rotate about a horizontal axis, a hopper forming a bearing support for the smaller end of the hollow pick-up member, said hopper being provided with a discharge port for delivering rivets in an axial direction with relation to the pick-up member, said pick-up member being provided with rivet-receiving notches at its larger end, a closure plate for the larger end of the pick-up member, and a bracket member extending from the closure plate to the hopper through said hollow pick-up member, said bracket member having a formation in cross-section which will prevent the lodgement of rivets thereon.

5. In a rivet feeding device, a hollow pick-up member having a tapered formation and provided with rivet pick-up slots at its larger end, a supporting member on which the pick-up member is rotatably mounted for rotation about a horizontal axis, and said supporting member being provided with a passageway through which rivets are fed into the pick-up member through the smaller end thereof, said passageway being arranged to deliver rivets axially of the pick-up member whereby the rivets will be assisted by gravity to move down the slope of the pick-up member to the pick-up slots at the larger end thereof.

In testimony whereof I affix my signature.

EDWIN B. STIMPSON.